H. H. POTTER.
Curd-Cutter.

No. 218,450. Patented Aug. 12, 1879.

Attest:
H. D. Perrine
A. M. Long

Inventor
Henry H. Potter
By H. J. Abbot
Atty.

UNITED STATES PATENT OFFICE

HENRY H. POTTER, OF STERLINGVILLE, NEW YORK.

IMPROVEMENT IN CURD-CUTTERS.

Specification forming part of Letters Patent No. 218,450, dated August 12, 1879; application filed January 3, 1879.

*To all whom it may concern:*

Be it known that I, HENRY H. POTTER, of Sterlingville, in the county of Jefferson and State of New York, have invented certain new and useful Improvements in Curd-Cutters; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1:
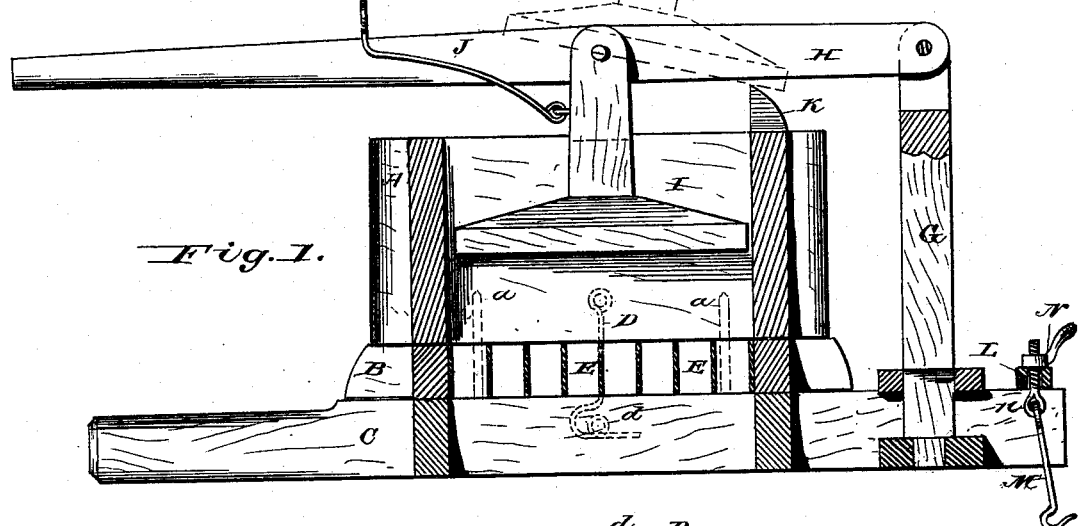
Figure 2:
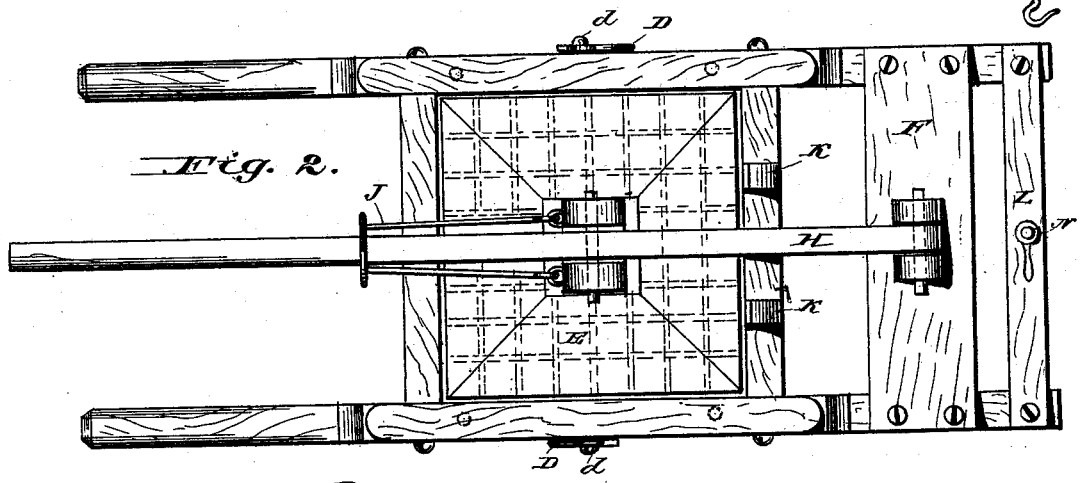
Figure 3:
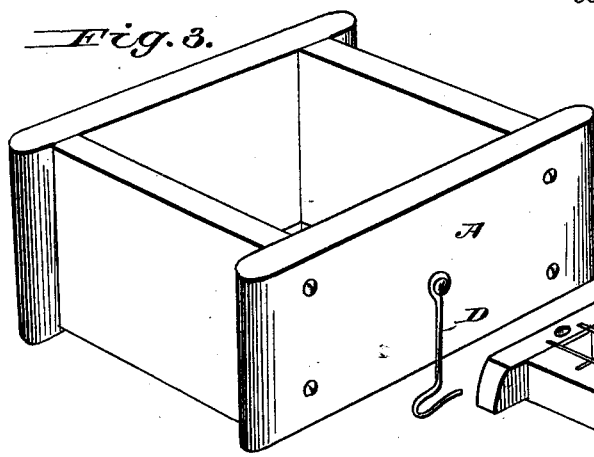
Figure 4:
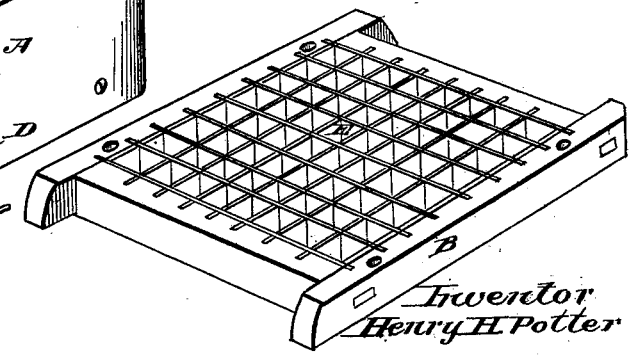

Figure 1 is a sectional side view; Fig. 2, a plan view; Fig. 3, a perspective of hopper, and Fig. 4 a perspective of frame and knives.

My invention relates to curd-cutters; and it consists in the construction and combination of parts hereinafter particularly specified.

In the accompanying drawings, A indicates the hopper, which rests on the frame B, supported by the frame C, the three parts being held together by pins $a$, which rise vertically from frame C, and pass through holes in frame B and hopper A, as represented by dotted lines in Fig. 1. These parts are further secured by hooks D and pins $d$.

The frame B has blades or knives E run transversely and longitudinally across it, which are designed to cut the curd.

To the rear end of the frame D, extending from one side to the other thereof, there is secured a platform, F, on which rests a vertical post, G, to the upper end of which is hinged a lever, H. To this lever, at such point as will allow it to fit within the hopper, there is hinged a follower, I, which consists of a plate and an arm, the latter being the part directly connected to the aforementioned lever.

A bail, J, is hooked or otherwise secured to the arm of the follower, as shown in Fig. 1, the free end or handle of which is above the lever. The function of this bail is to swing the follower forward after the lever has been raised sufficiently to free the follower from the sides of the hopper, in order that the hopper may be easily filled with the curd.

After the hopper is filled the bail is released and the follower swings backward, and, striking against the lugs K on the hopper, is stopped in that position, which will permit it to be pressed down on the curd in the hopper, and will prevent it from swinging so far back as to rest on the edge of the hopper.

When the hopper is being filled with curd, the follower may rest on the forward edge of the hopper, or it may rest on the lugs K, as shown in dotted lines, Fig. 1.

A bar, L, extends from one side to the other of the frame C, at the rear end thereof, and from this bar there hangs a hook, M, held to the bar by a bolt, $n$, and nut N. This hook is to fasten the frame to the curd-vat, over which the cutter is placed, and is to prevent that end of the frame from being raised when the lever is depressed for the purpose of pressing the follower onto the curd in the operation of cutting.

The operation is simple and explained in a few words. The hopper is filled with curd, and the follower pressed onto the curd by means of the lever. This forces the curd onto the blades, and as it is cut by them it passes between them and into the vat below.

The operation of the follower when raised from the hopper has already been given, and will not therefore be repeated.

The device is simple both in construction and operation, and not easily got out of repair.

Having described my invention, what I claim is—

1. The combination of hopper A, lugs K, lever H, and follower I, substantially as set forth.

2. The combination of lever H, follower I, and bail J, substantially as and for the purpose set forth.

3. The hinged lever H, provided with swinging follower I, in combination with hopper A, provided with lugs K and cutting-blades E, substantially as set forth.

In testimony that I claim the foregoing as my own I affix my signature in presence of two witnesses.

HENRY H. POTTER.

Witnesses:
JOHN SHARON,
JOS. ESSINGTON.